MEANS FOR SUPPORTING AND GUIDING HORIZONTALLY SLIDING DOORS

Filed Sept. 13, 1944 6 Sheets-Sheet 1

INVENTORS.
SAWYER M. POMEROY
& IRA R. DISBRO.
BY Fay, Golrick, Chilton & Isler.
Attorneys.

MEANS FOR SUPPORTING AND GUIDING HORIZONTALLY SLIDING DOORS

Filed Sept. 13, 1944 6 Sheets-Sheet 2

INVENTORS.
SAWYER M. POMEROY
&IRA R. DISBRO.
BY
Fay, Golrick, Chilton & Isler.
Attorneys.

MEANS FOR SUPPORTING AND GUIDING HORIZONTALLY SLIDING DOORS

Filed Sept. 13, 1944 6 Sheets-Sheet 3

INVENTORS.
SAWYER M. POMEROY
& IRA R. DISBRO.
BY Fay, Golrick, Chilton & Isler
Attorneys.

MEANS FOR SUPPORTING AND GUIDING HORIZONTALLY SLIDING DOORS

Filed Sept. 13, 1944 6 Sheets-Sheet 4

INVENTORS.
SAWYER M. POMEROY
& IRA R. DISBRO.
BY Fay, Golrick, Chilton & Isler.
attorneys.

MEANS FOR SUPPORTING AND GUIDING HORIZONTALLY SLIDING DOORS

Filed Sept. 13, 1944 6 Sheets-Sheet 5

INVENTORS.
SAWYER M. POMEROY
& IRA R. DISBRO.
BY Fay, Golrick, Chilton & Isler
Attorneys.

MEANS FOR SUPPORTING AND GUIDING HORIZONTALLY SLIDING DOORS

INVENTORS.
SAWYER M. POMEROY
& IRA R. DISBRO.
BY Fay, Golrick, Chilton & Isler.
Attorneys.

Patented Nov. 13, 1951

2,574,496

UNITED STATES PATENT OFFICE 2,574,496

MEANS FOR SUPPORTING AND GUIDING HORIZONTALLY SLIDING DOORS

Sawyer M. Pomeroy, Lyndhurst, and Ira R. Disbro, Lakewood, Ohio, assignors to The W. S. Tyler Company, Cleveland, Ohio, a corporation of Ohio Application September 13, 1944, Serial No. 553,926

1 Claim. (Cl. 20—19)

This invention relates, as indicated, to means for supporting and guiding horizontally sliding doors, but has reference more particularly to elevator entrance doors.

For the operation of horizontally sliding doors, particularly elevator entrance doors, it is common practice to provide, above the door, a track which is permanently attached to a header plate, and to provide each door with either two spaced unit type hangers, or a single continuous hanger extending substantially the full width of the door, there being set into such hangers sheaves which travel on the track during the door operation.

In the usual case, the doors are suspended from the bottom of the hangers by means of bolts, and any adjustments between the hangers and the doors, which are required to plumb the door, are obtained either by the use of shims, or by easing off the hanger bolt at one side of the door and tightening the bolt at the other side, until the door is plumb. The bolts are then secured in adjusted position by means of lock nuts. One disadvantage of this method of hanging doors is that it is frequently difficult to secure accurate vertical alignment of the hangers with the face of the door, any misalignment in this respect being likely to result in inefficient operation of the door. Another disadvantage of this method is that the entire weight of the door is supported by the hanger bolts, and, since the arm of the power operator is attached to the door, the repeated shocks due to the action of the operator, are borne by the hanger bolts. Even when oversize bolts are used, there is always the danger that the bolts will be loosened or even broken by such shocks. Still another disadvantage of present day construction of door hangers is that most of the hangers, and especially those which are adapted for high speed power operation, require so much height above the door that it is often difficult, if not impossible, to install them in the available space. This is particularly true in cases where new elevator entrances have to be installed in old buildings.

The present invention has as its primary object the provision of means for supporting horizontally sliding doors which overcomes all of the aforesaid disadvantages.

Another object of the invention is to provide door suspension means of the character described which is built into the door as a virtually integral part thereof, thereby securing great strength and rigidity as well as perfect alignment of the hanger with the face of the door.

A further object of the invention is to provide door suspension means of the character described, through the use of which the weight of the door is supported from a point above the track, thereby eliminating the necessity of using pendant bolts, and in which any adjustment required to plumb the door is obtained by means of studs located within the hanger and above the track.

A further object of the invention is to provide a door hanger of the character described which requires considerably less space above the head of the doorway than any other sheave type hanger which is adapted for high speed power operation, thereby permitting its use in cases where the head room is extrtmely limited.

A still further object of the invention is to provide a novel upthrust limit device for horizontally-sliding door hangers.

Other objects and advantages of the invention will be apparent during the course of the following description.

In the accompanying drawings, forming a part of this specification, and in which like numerals are employed to designate like parts throughout the same, Fig. 1 is a fragmentary elevational view of the upper portion of a sliding elevator door having incorporated therein one form of hanger of the present invention;

Figure 1:
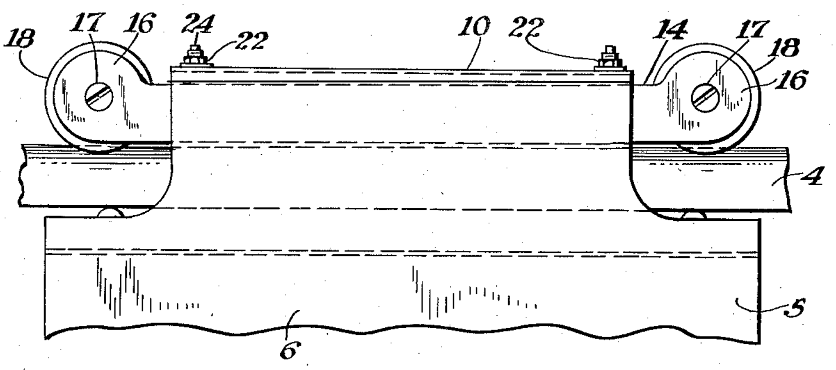
Figure 2:
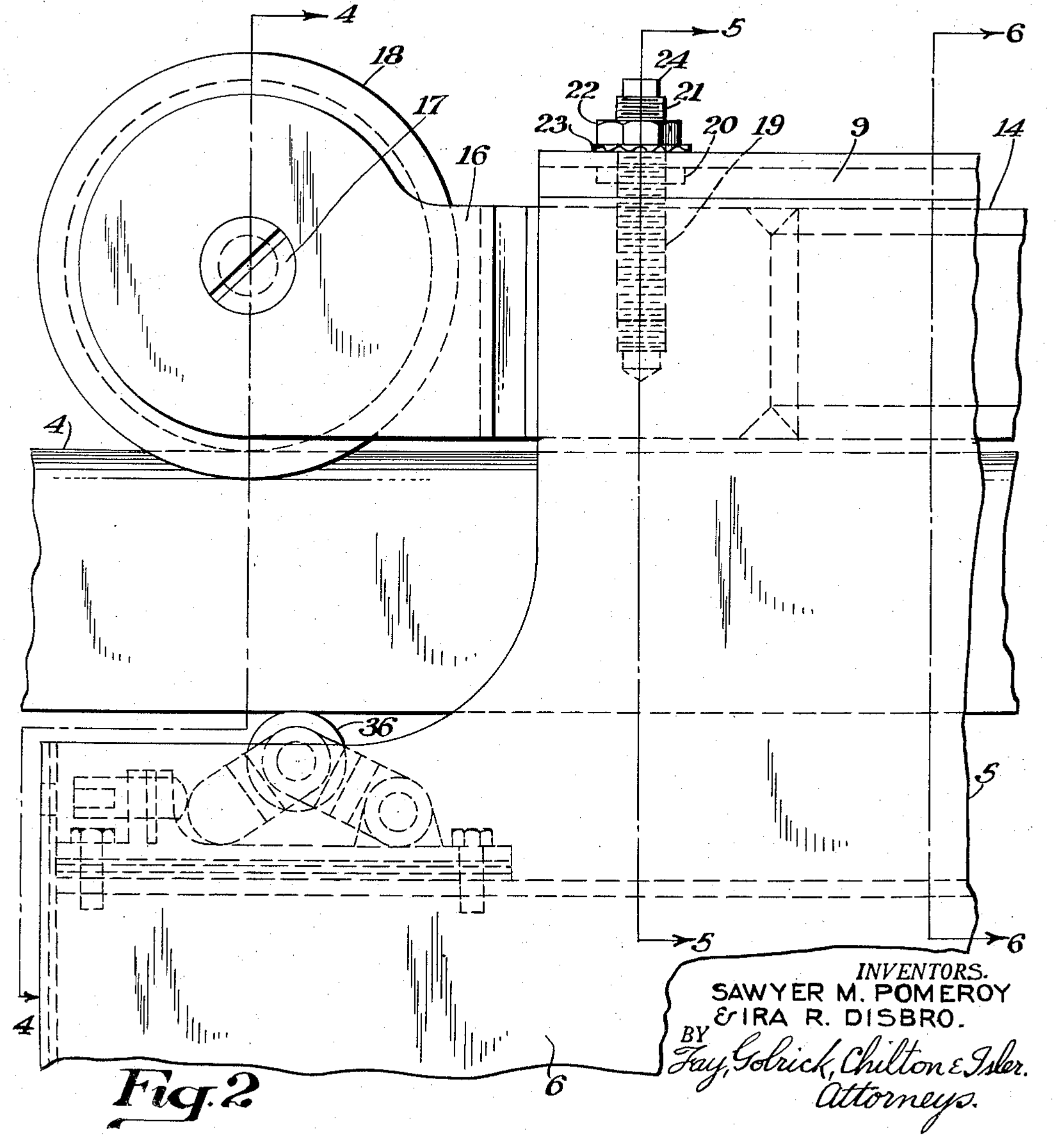
Fig. 2 is an enlarged view of the left hand portion of Fig. 1.

Referring more particularly to Figs. 1 to 14 inclusive, there is disclosed a header plate 1, which is disposed, in the conventional manner above the doorway, and has secured thereto, as by means of spacer blocks 3, a track 4 for the sliding door.

The door, which is generally designated by reference numeral 5, is of conventional hollow construction, consisting of a front sheet 6, and a rear sheet 7, these sheets having flanges 8 at their edges, with the flanges of the sheet 7 nested in the flanges of the sheet 6 to form the hollow door. The sheet 6 extends to a level above the sheet 7. Disposed in the space between the upper portions of the sheets 6 and 7 is a hanger of substantially channel-shaped cross-section, having a web portion 9 which is welded or otherwise secured to the rear face of the sheet 6, horizontally-disposed flanges 10 and 11, an upwardly extending or rebent flange 12, which is welded or otherwise secured to the front face of the sheet 7, and a downwardly extending or rebent flange 13, which is coplanar with the flange 12, the flanges 12 and 13 being generally parallel with the body portion or web 9 of the hanger. The upper corners of the sheets 6 and 7 as well as the hanger are cut away for a purpose to be presently described.

Figure 7:
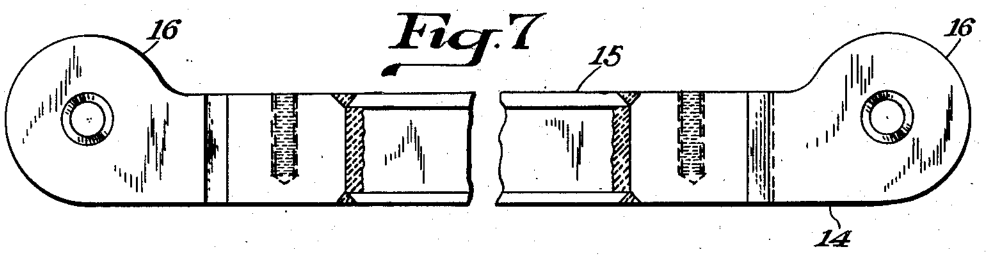
Fig. 7 is an elevational view of the carrier assembly.
Figure 8:
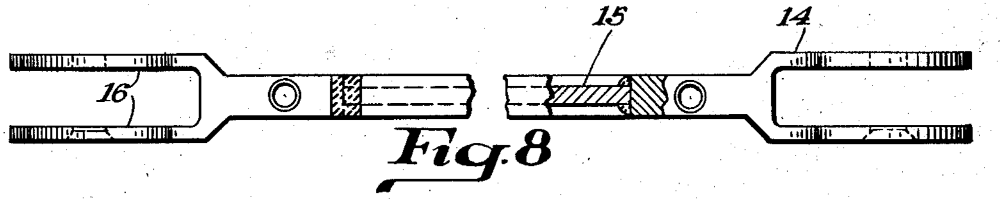
Fig. 8 is a top plan view of the carrier assembly.
Figure 9:
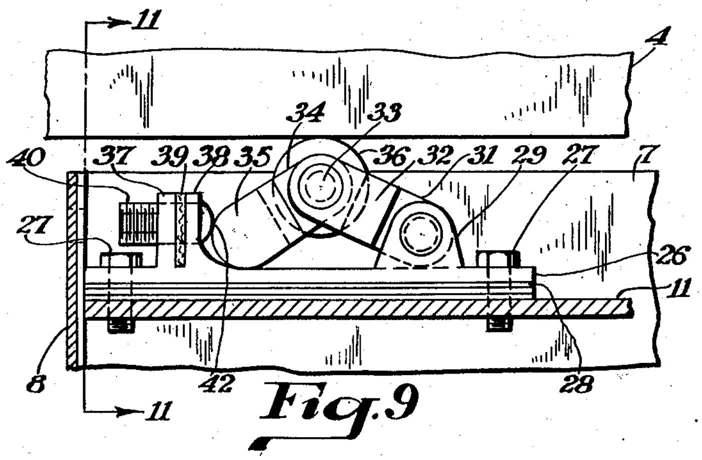
Fig. 9 is a view, on an enlarged scale, of a portion of Fig. 2, with portions of the door broken away, showing the novel upthrust limit device of the present invention.
Figures 10, 11:
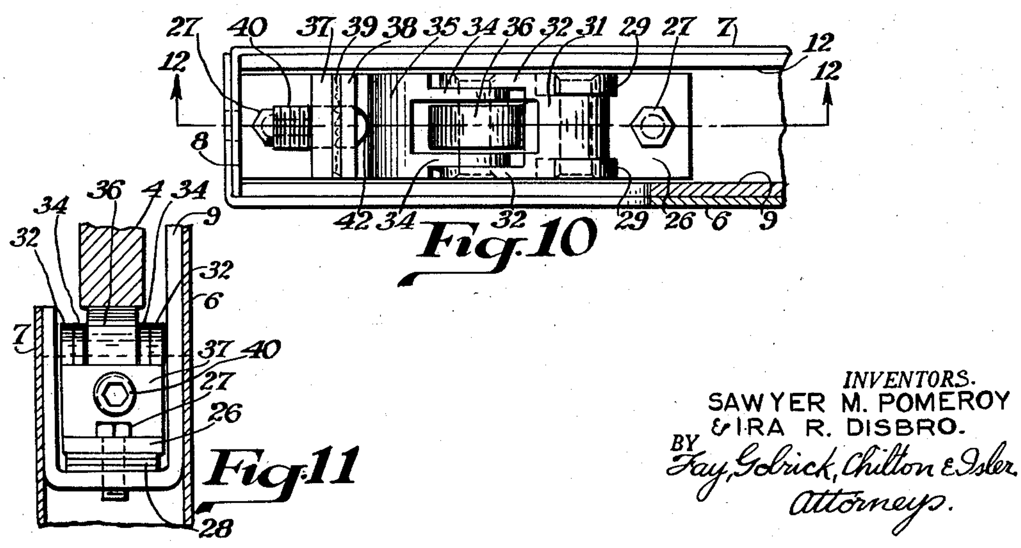
Fig. 10 is a top plan view of the parts shown in Fig. 9.
Fig. 11 is a cross-sectional view, taken on the line 11—11 of Fig. 9.
Figure 12:
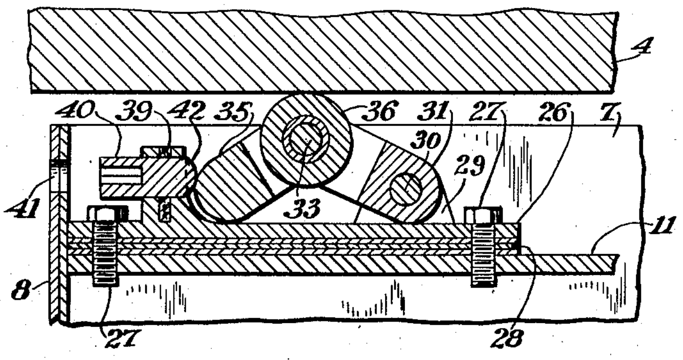
Fig. 12 is a cross-sectional view, taken on the line 12—12 of Fig. 10.
Figure 13:
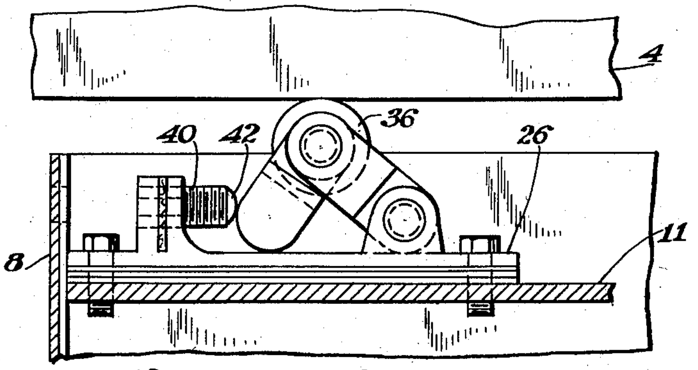
Fig. 13 is a view similar to Fig. 9, but showing the highest setting of the upthrust limit device.
Figure 14:
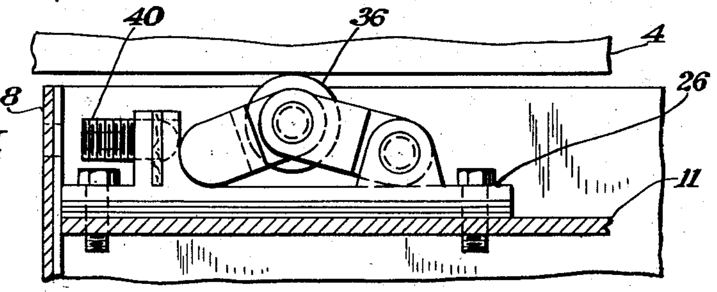
Fig. 14 is a view similar to Fig. 9, but showing the lowest setting of the upthrust limit device.
Figure 15:
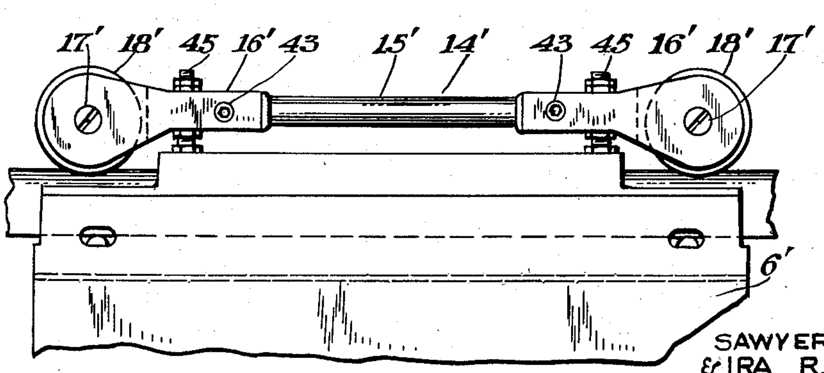
Fig. 15 is a view similar to Fig. 1, but showing a modified form of the invention.
Figure 16:
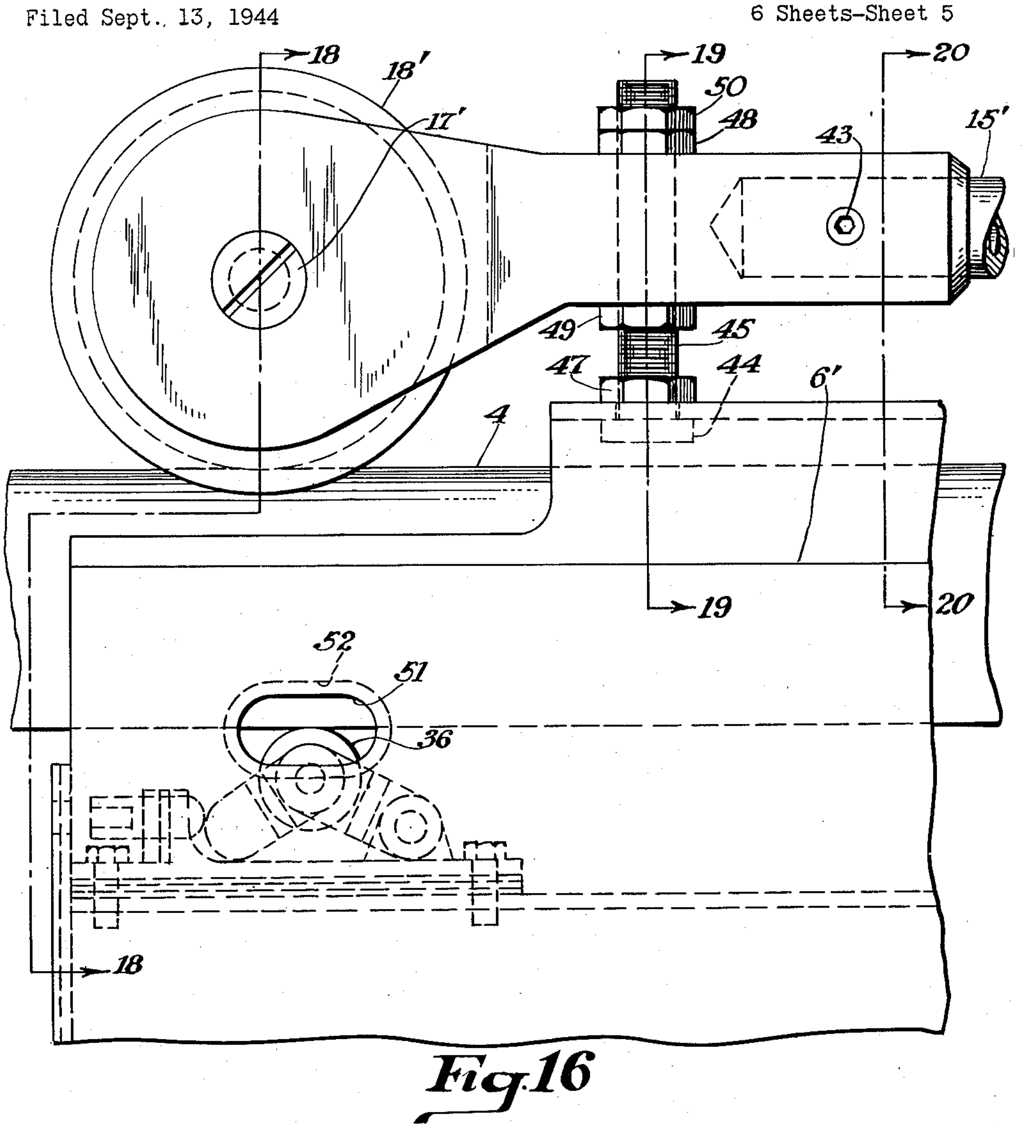
Fig. 16 is a view similar to Fig. 2, but of the modified form of the invention.
Figure 17:
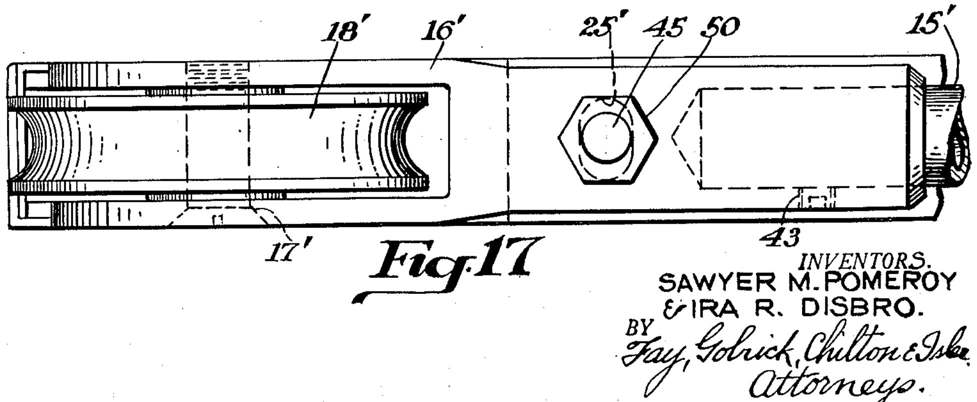
Fig. 17 is a top plan view of the portion of the door shown in Fig. 16.
Figures 19, 20:
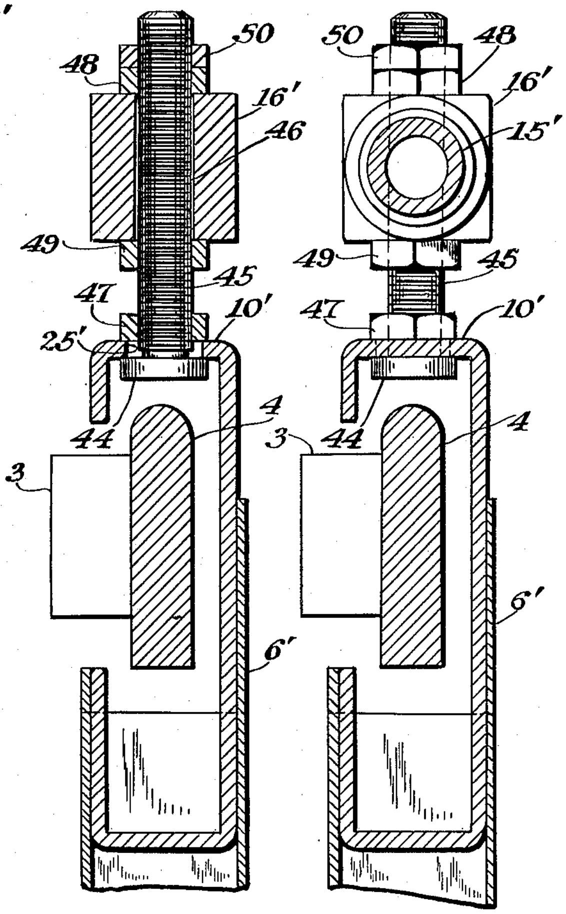
Fig. 19 is a cross-sectional view, taken on the line 19—19 of Fig. 16.
Fig. 20 is a cross-sectional view, taken on the line 20—20 of Fig. 16.
Figure 18:
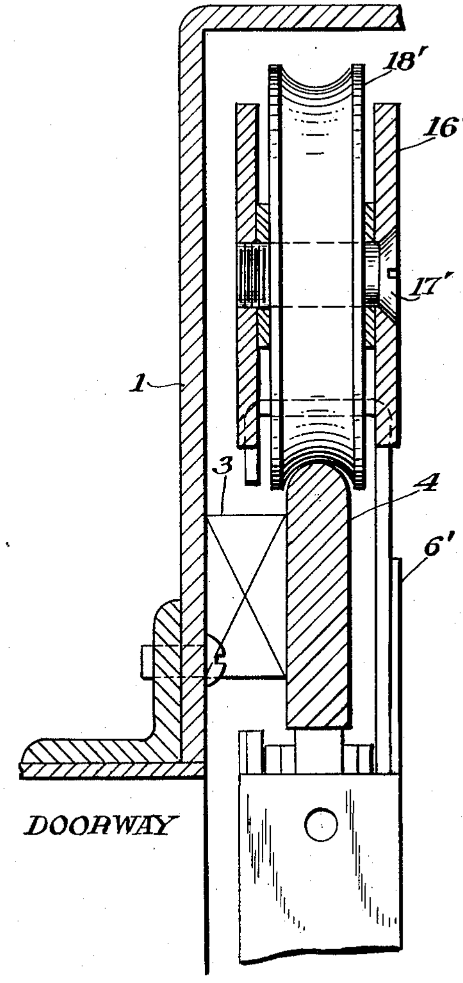
Fig. 18 is a vertical cross-sectional view, taken on the line 18—18 of Fig. 16, and showing also the lower portion of the door.
Figure 21:
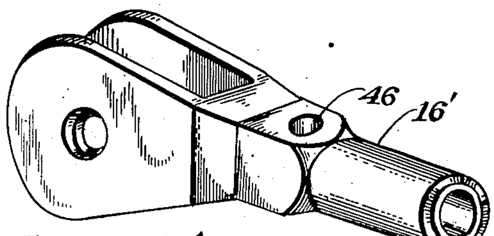
Fig. 21 is an isometric perspective view of one of the yokes of the modified form of carrier.

Extending through and substantially parallel with the hanger is a carrier, which is generally designated by the reference numeral 14 and which consists of a central portion or bar 15 having a cross-section similar to that of an I-beam, and end portions 16 in the form of yokes, which are arc-welded to the central portion, as indicated in Figs. 7 and 8. Mounted on these yokes are screws 17 forming shafts upon which sheaves 18 are journalled, such sheaves being preferably of the type described in U. S. Patent No. 2,230,744. The sheaves 18 are mounted for rolling movement on the track 4, and the door and hanger are cut away at their upper corners in order to accommodate the track as well as to provide space for the yokes 16, which, it will be noted, are approximately of the same thickness as the thickness of the door.

The carrier is suspended from the flange 10 of the hanger, and for this purpose, spaced studs are provided having lower threaded portions 19 which extend into threaded openings in the yokes 16, annular flanges 20 which are in engagement with the lower surface of the flange 10 of the hanger, and upper threaded portions 21 which extend through the flange 10. The studs are removably secured to the flange 10 by means of nuts 22 which are secured to the portions 21 of the studs and bear against washers 23 which are interposed between the nuts and the upper face of the flange 10. The studs have squared upper ends 24 which facilitate turning of the studs for adjustment purposes. The portions 21 of the studs extend through slots 25 in the flange 10, these slots having their long dimension transverse of the flange 10, so as to permit adjustment of the door transversely of the track 4.

It will be apparent from the foregoing description that we have provided a door hanger construction which overcomes the disadvantages of previous types of sliding door hangers, which is built into the door as a virtually integral part thereof, thereby securing great strength and rigidity as well as perfect alignment of the hanger with the face of the door. The weight of the door is supported from a point above the track; the use of pendant bolts has been eliminated, and any adjustment required to plumb the door is obtained by means of the studs located within the hanger and above the track. The door hanger, moreover, requires a minimum of space above the head of the doorway, so that the door is well adapted for use in locations where head room is extremely limited.

In sliding doors of this type, it is customary to provide under each sheave, in the space between the bottom of the hanger, an adjustable upthrust limit device which can be set to permit a free running clearance between the device and the lower edge of the track, while at the same time preventing the sheaves from being forced up away from the track when the power of the operator is applied to the door at the inception of the opening and closing movements of the door. Such devices are required especially in the case of high speed, power-operated doors, since, without them, the application of power to the door would tend to tip the door and might even force one of the sheaves up entirely free from the track, thus making the operation of the door unsatisfactory and even dangerous. Several types of adjustable devices are now in use for holding the sheaves on the track.

One of such devices consists of a wheel, generally ball-bearing, mounted upon an eccentric shaft, the wheel being raised or lowered by turning the eccentric shaft, and, when the wheel is in the desired position, the shaft is secured in place by means of a lock nut. This type of device has several undesirable features. In the first place, the eccentric shaft generally has an offset of only $\frac{1}{8}$'', which provides a very short leverage to oppose the severe shocks resulting from power operation of the door. In the second place, the lock nut either has to project beyond the plane of the door into the running clearance, or, it has to be recessed into a pocket, and this makes it necessary either to cast the hanger, or to provide a separate plate holder for the eccentric, which is expensive to make and to install.

Another type of upthrust limit device consists of a wheel mounted in a holder, which extends from the wheel horizontally at one end and is pivoted at this end on a pivot which extends through the hanger. The adjustment in height is obtained by means of a screw which extends through the bottom of the hanger up to the underside of the wheel holder. This screw raises the wheel holder to the proper height and is then secured in place by means of a lock nut below the hanger. This type of device is mechanically satisfactory, but requires considerable space between the bottom of the housing and the lower face of the track. Another disadvantage is that it is expensive to make and to install.

Still another type of upthrust device consists of a hollow screw which extends vertically up through the bottom of the hanger, and into the hollow of which is inserted the stem of a mushroom-shaped piece of a non-metallic substance. The screw raises this mushroom-shaped piece up to the desired position and is then secured in place by means of a lock nut. This type of device has the undesirable feature that it provides a sliding friction with the track instead of a rolling contact, which makes it unsatisfactory for use, except with low-speed, manually-operated doors.

The upthrust limit device of the present invention has been designed to overcome all of the aforesaid disadvantages. It comprises a carriage 26 which is mounted upon and is secured to one end of the flange 11 of the hanger by means of cap screws 27, a suitable number of shims 28 being interposed between such carriage and the flange if necessary. The carriage 26 is provided with a pair of upstanding transversely-shaped ears 29 forming a support for a shaft 30 to which is pivotally secured a rocker arm 31.

The rocker arm 31 is, in turn, provided with spaced ears 32 in which a shaft 33 is mounted and to which the ears 34 of a second rocker arm 35 are pivotally secured. Journalled on the shaft 33, between the ears 34, is a hardened steel roller 36.

The carriage 26 is further provided with a pair of upstanding longtiudinally-spaced elements 37 and 38 between which a piece of fibrous material 39 is interposed. The elements 37 and 38 are provided with aligned threaded opening for the reception of a socket-head set screw 40. The fiber piece 39 is also provided with an opening which is aligned with the threaded openings in the elements 37 and 38, and through which the set screw 40 extends, but this opening is somewhat smaller in diameter than the latter openings, so that the screw is forced to tap its way through the fiber piece. This has been found to be effective in causing the set screw to remain set in adjusted position, due to the friction between the threads of the set screw and the threads which are cut thereby in the fiber piece.

Access to the set screw 40 for the purpose of rotating the same by means of an Allen wrench may be had through an opening 41 in the edge of the door 5.

The set screw 40 is provided with a point 42 which is in engagement with the rocker arm 35. By rotating the set screw 40 in either direction, a change in elevation of the steel roller 36 is accomplished, the roller being shown in Figs. 2, 9 and 11 in its normal position in relation to the track 4, there being a slight clearance of several thousandths of an inch between the roller and track. By rotating the screw 40 in one direction, the roller may be elevated to the position shown in Fig. 13, and by rotating the screw in the opposite direction, the rocker arms will be free to descend by gravity, bringing the roller to the lowered position shown in Fig. 14.

Among the advantages of this upthrust limit device may be mentioned the following: (1) The device is self-contained and is very easily installed. (2) Since all adjusting is done through an opening in the edge of the door, no openings in, nor projections from, the face portions of the door are required for this purpose. (3) The device is sturdy and inexpensive to make, and its action is mechanically sound, since the shocks due to the action of the operator are transmitted symmetrically through the rocker arms 31 and 35 to the carriage 26. (4) The device requires less height than any other which is equally efficient in operation, and (5) The device is the only upthrust limit device which is well adapted for use in a hanger which is built into the door, as in the present case.

Figures 3, 4, 5, 6:
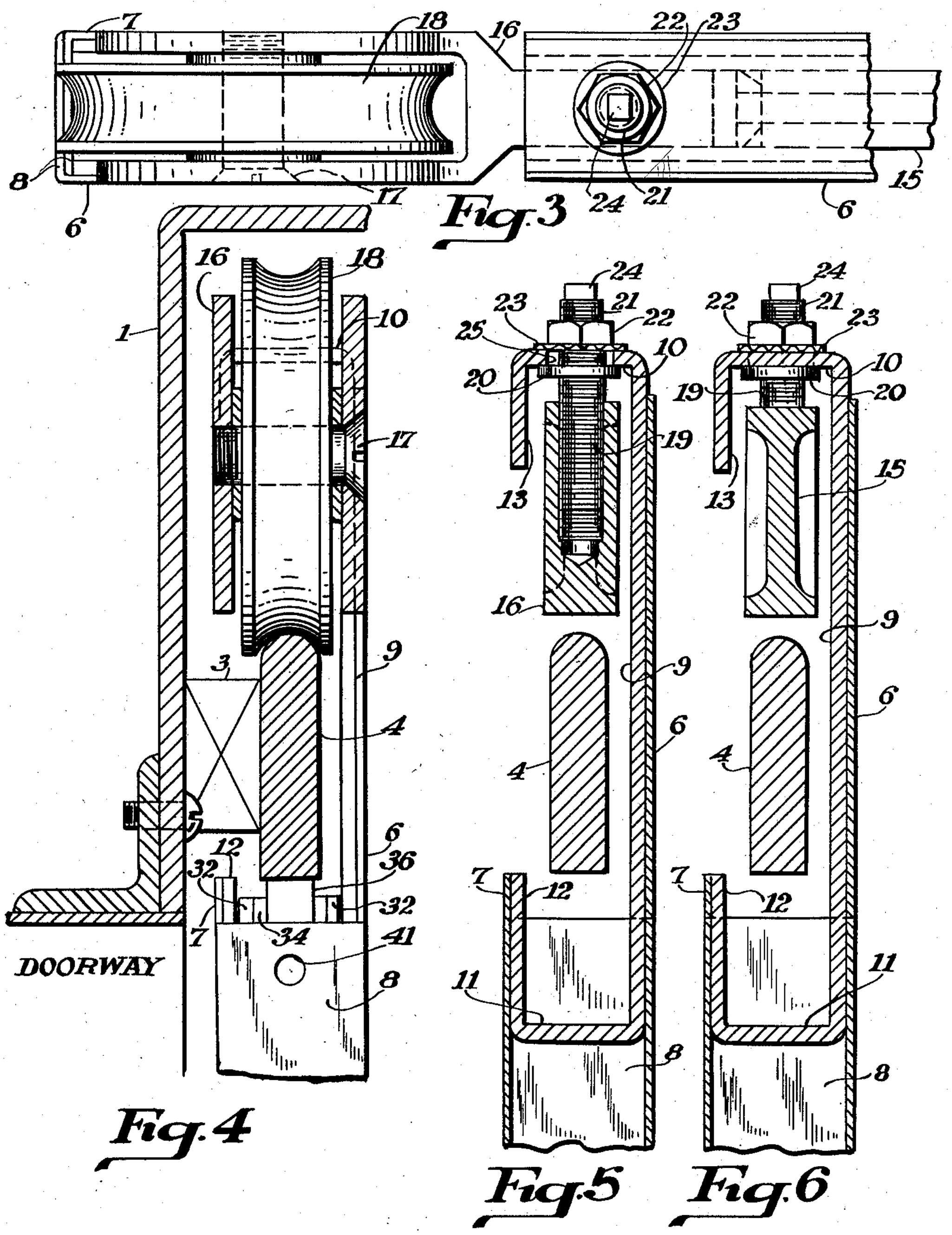
Fig. 3 is a top plan view of the portion of the door shown in Fig. 2.
Fig. 4 is a vertical cross-sectional view, taken on the line 4—4 of Fig. 2, and showing also the lower portion of the door.
Fig. 5 is a vertical cross-sectional view, taken on the line 5—5 of Fig. 2.
Fig. 6 is a vertical cross-sectional view, taken on the line 6—6 of Fig. 2.

Referring now to Figs. 15 to 21 of the drawings, wherein is shown a modified form of the hanger construction, it will be noted (Fig. 18) that the same height is maintained between the top of the doorway and the horizontal flange of the header plate 1, as in that form of the invention shown in Fig. 4.

In this modified form of the invention, the front sheet 6′ of the door does not extend as high as the sheet 6 of the previously described form of the invention, and the hanger is also of considerably less depth than the previously described hanger, the upper flange 10′ thereof being disposed just above the upper edge of the track 4.

Extending above and substantially parallel with the hanger is a carrier, which is generally designated by the reference numeral 14′, and which consists of a central tubular portion or tube 15′ and end portions 16′ in the form of yokes similar to the yokes 16, which are secured, as by a push fit, to the ends of the tube 15′, set screws 43 being provided to hold the parts in assembled relation.

Mounted on these yokes are screws 17′ forming shafts upon which sheaves 18′ are journalled, such sheaves being preferably of the type described in U. S. Patent No. 2,230,744. The sheaves 18′ are mounted for rolling movement on the track 4, and portions of the door and hanger are cut away in order to accommodate the track as well as to provide space for the yokes 16′, which, it will be noted, are approximately of the same thickness as the thickness of the door.

The hanger, in this case, is suspended from the carrier, and for this purpose, spaced studs are provided having heads 44 and threaded steams 45. The heads 44 are in engagement with the lower surface of the flange 10′ of the hanger and the threaded stems 45 extend through vertical openings 46 in the yokes 16′. The studs are removably secured to the flange 10′ of the hanger by means of nuts 47 which are secured to the portions 45 of the studs and bear against the upper surface of the yokes. The yokes are maintained in spaced relation to the flange 10′ of the hanger by means of nuts 48 and 49 which are threadedly secured to the stems 45 of the studs and respectively bear against the upper and lower faces of the yokes. Displacement of the nuts 48 and 49 from the yokes is prevented by means of lock nuts 50 which are secured to the upper ends of the stems 45 and bear against the nuts 48.

The foregoing construction permits of easy adjustment of the spacing between the carrier and door hanger, and permits adjustment for parallelism between the carrier and door hanger. The threaded stems 45 of the studs extend through slots 25′ in the flange 10′, these slots having their long dimensions transverse of the flange 10′ so as to permit adjustment of the door transversely of the track 4.

It will be noted that the modified form of hanger construction has inherent therein all of the advantages of the previously described form of hanger construction.

The upthrust limit devices used in the modified form of construction are identical with those used in connection with the first form of hanger construction, but in this case, suitable elongated openings 51 and 52 are provided in the front door sheet and hanger respectively for the insertion of a feeler gauge for the purpose of determining the clearance between the lower edge of the track 4 and the rollers 36 of the upthrust devices.

It is to be understood that the form of our invention, herewith shown and described, is to be taken as a preferred example of the same, and that various changes in the shape, size and arrangement of parts may be resorted to, without departing from the spirit of our invention, or the scope of the subjoined claim.

Having thus described our invention, we claim:

In a sliding door structure, a door; a horizontal bar forming a track for supporting the door; a carriage mounted on the track and comprising an elongated member with a sheave mounted on each end thereof so that the member is suspended between the sheaves, said sheaves being adapted to roll on said track, the said sheaves being disposed proximate to the vertical planes of the side edges of the door, respectively, said door having the top edges at the side portions thereof below the said bar and having a part extending upwardly from its central top portion, and means for connecting said part to said elongated carriage member intermediate the sheaves; a flange adjacent to the top side edges of the door and extending beneath and parallel to said bar; and an upthrust limit device mounted on said flange comprising, a base member mounted to the flange, a pair of toggle links extending longitudinally relative to said bar, one of said links being pivotally connected at one end to the base member and at the other end to one end of the other link, means for adjustably positioning the end opposite said one end of said other link to vary the angle between said links; and an abutment member carried by the links at their connected ends, said abutment member being disposed directly beneath one of said sheaves and adapted to engage the under side of said bar in the event the door tends to tilt relative to the bar.

SAWYER M. POMEROY.
IRA R. DISBRO.

REFERENCES CITED

The following references are of record in the file of this patent:

UNITED STATES PATENTS

| Number | Name | Date |
|---|---|---|
| 183,857 | Laauwe | Oct. 31, 1876 |
| 632,609 | Wilbern | Sept. 5, 1899 |
| 716,152 | Watson | Dec. 16, 1902 |
| 815,182 | Lange, Jr. | Mar. 13, 1906 |
| 927,272 | Ohl | July 6, 1909 |
| 1,353,176 | Metzger | Sept. 21, 1920 |
| 1,594,357 | Dodge | Aug. 3, 1926 |
| 1,702,799 | Shonnard | Feb. 19, 1929 |
| 2,028,627 | Sherron | Jan. 21, 1936 |
| 2,066,994 | Moore | Jan. 5, 1937 |
| 2,132,817 | Zetmeir | Oct. 11, 1938 |
| 2,230,744 | Disbro | July 22, 1938 |
| 2,286,974 | Oleksiw | June 16, 1942 |